H. BARTH.
Machines for Planing Stereotype Plates.
No. 136,204.  Patented Feb. 25, 1873.
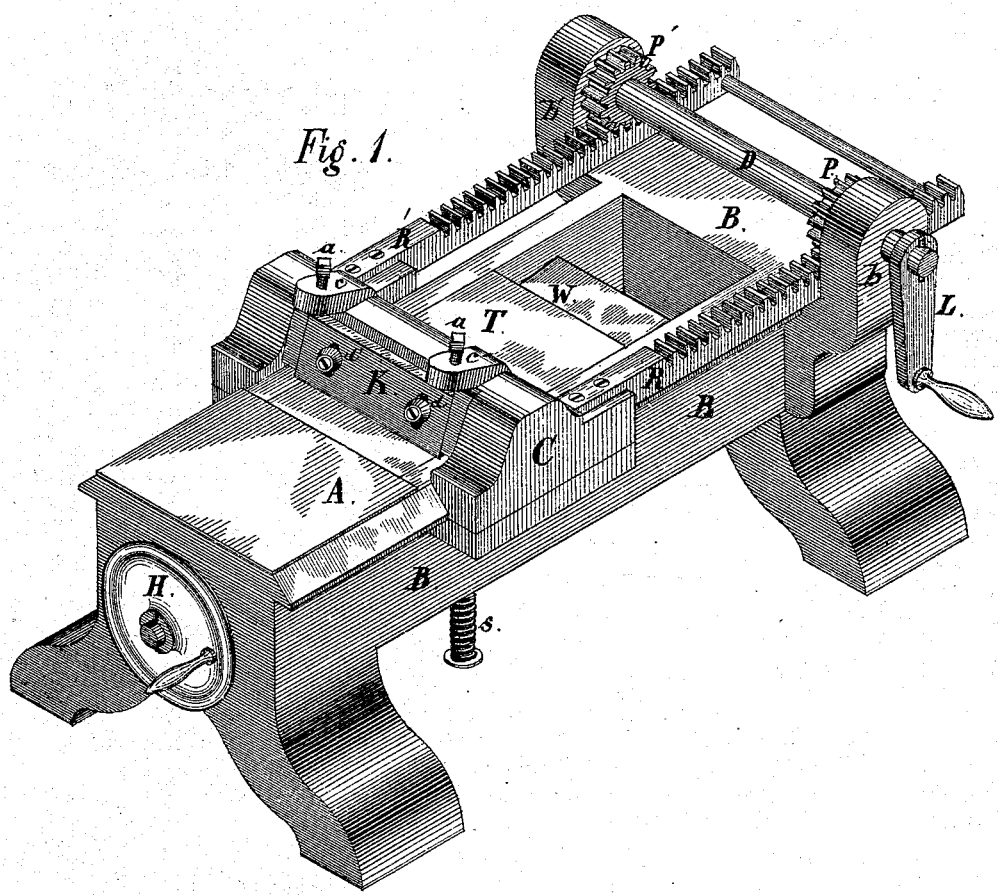
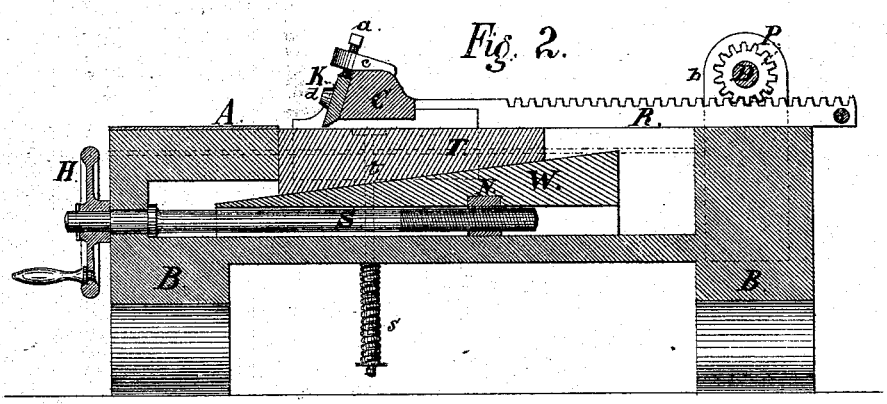

UNITED STATES PATENT OFFICE.

HENRY BARTH, OF CINCINNATI, OHIO.

IMPROVEMENT IN MACHINES FOR PLANING STEREOTYPE-PLATES.

Specification forming part of Letters Patent No. 136,204, dated February 25, 1873.

*To all whom it may concern:*

Be it known that I, HENRY BARTH, of Cincinnati, Hamilton county, Ohio, have invented a certain new and useful Improvement in Machines for Planing Stereotype-Plates, of which the following is a specification:

Nature and Objects of Invention.

My invention consists in a device for planing the backs of stereotype-plates to a true level, wherein, by the use of a movable quoin or wedge-shaped elevating-block, operated by a screw, the bed of the machine may be so elevated or depressed as to expose the plate in a greater or less degree to the action of the cutter, thereby regulating the thickness of the shaving to be taken off, and enabling the reduction of the plate to any desired thickness.

Description of Drawing.

Figure 1 is a perspective view of a machine embodying my invention. Fig. 2 is a vertical longitudinal section of the same.

General Description.

B is the frame of the machine, having at one end a metallic cap-plate, A, the use of which will appear hereafter, and near the other two raised standards, $b\ b$, in which is journaled the shaft D, carrying two pinions, P P', and having at one end the winch L, by which the machine is operated. These pinions P P' work in toothed racks R R', which carry at their extremities the cutter-frame C. Attached to this frame, and adjustable upon it, by means of screws $a\ a$ working in lugs $c\ c$, is the cutter or planing-knife K, connected with the frame by means of screws $d\ d'$ passing through slots in the blade K, which enable its adjustment by means of screws $a\ a$. T is the table or bed-plate of the machine, detached and movable in a perpendicular direction. Spiral springs $s$, coiled around bolts $t$ passing through both frame and table, act constantly to depress it. Its lower surface is an inclined plane resting upon the inclined surface of the wedge or quoin W, which has a longitudinal motion, and is carried by the screw S, journaled in the end of the frame B, and operated by the hand-wheel H. By the forward motion of this quoin W the table T may be elevated to the full height of the cap-plate A, and on its retraction the table is drawn down by the springs $s$.

The stereotype-plate to be leveled and planed is placed upon this table, face downward, and adjusted to abut against the plate A, which serves as a stop. By means of the wheel H, screw S, and quoin W, the table T is now adjusted with nicety to the desired height, and by means of the winch, pinions, and racks the cutter-blade is passed over it, and this operation may be repeated at will till the plate has been reduced to the desired thickness, and leveled on its back ready for the customary mounting.

Claim.

In combination with the frame B, the movable table T, quoin W, screw S, and cutter-head C, when arranged and acting substantially as above set forth, for the purpose specified.

In testimony of which invention I hereunto set my hand.

H. BARTH.

Witnesses:
J. L. WARTMANN,
JOHN JONES.